United States Patent [19]

Davis et al.

[11] 4,436,789

[45] Mar. 13, 1984

[54] POLYOXAZOLINE-MODIFIED, PAPER COATING

[75] Inventors: Roy A. Davis; Norman L. Madison, both of Midland, Mich.

[73] Assignee: The Dow Chemical Company, Midland, Mich.

[21] Appl. No.: 182,250

[22] Filed: Aug. 28, 1980

[51] Int. Cl.[3] .............................................. C08L 79/02
[52] U.S. Cl. ..................................... 428/537; 524/17; 524/47; 524/413; 524/423; 524/425; 524/433; 524/447; 524/451; 524/612
[58] Field of Search ................... 260/8, 17.4 ST, 6, 13, 260/29.6 NR; 528/403, 423; 548/239; 524/502, 612, 17, 47, 413, 423, 425, 433, 447, 451, 617; 162/135; 428/532

[56] References Cited

U.S. PATENT DOCUMENTS

| | | | |
|---|---|---|---|
| 3,483,141 | 12/1969 | Litt | 260/2 |
| 3,483,145 | 12/1969 | Levy | 260/2 |
| 3,558,543 | 1/1971 | Tolty | 260/29.6 |
| 3,619,355 | 11/1971 | Silberman | 162/135 |
| 4,151,341 | 4/1979 | Lalk | 260/29.6 RW |
| 4,335,184 | 6/1982 | Miyamoto | 162/135 |

FOREIGN PATENT DOCUMENTS 52-2077205  6/1977  Japan.

OTHER PUBLICATIONS

Kirk–Othmer Encyclopedia of Chemical Technology, vol. 16, pp. 774–792, 3rd Edition.
Chem. Abs. 88: 24463w.
Leibowitz *Tappi* vol. 48, No. 1, pp. 73A–76A.
Hiroyasu et al., *Chem. Abs.* 88: 24,463w.
Litt et al., *Chem. Abs.* 65: 10,689.

*Primary Examiner*—John C. Bleutge
*Assistant Examiner*—Patricia Short
*Attorney, Agent, or Firm*—Charles J. Enright

[57] ABSTRACT

Polyoxazolines, such as poly-2-ethyl-2-oxazoline, having a weight average molecular weight in the range of from about 1,000 to about 150,000, are effective as dispersing agents for particulate matter found in starch/clay coatings and protein/latex clay coatings for paper. Usually, 0.005 percent to about 2.0 percent polyoxazoline, based on the total weight of the binder, effectively reduces the viscosity of said paper coatings, allowing the use of higher solids in the coating composition.

8 Claims, No Drawings

POLYOXAZOLINE-MODIFIED, PAPER COATING

BACKGROUND OF THE INVENTION

In order to obtain paper having characteristic good printability, it is necessary that the surface of the paper be smooth, and substantially free of indentations or valleys. Smooth papers are required for clear printed image formation and also for good transfer of ink to the paper. Methods are well-known for coating paper with pigment slurries, wherein said pigment slurries fill in the valleys of the rough paper. These pigment slurries in addition to rendering the paper smooth, are designed to improve the whiteness of the paper, its printability, its pick strength, its water resistance, and its ink holdout. Further, it is essential that the coating material is receptive to ink, i.e., it possesses a physical and/or chemical attraction to the printing ink.

The coating formulation material comprises at least two portions: the insoluble pigment portion and the liquid binder portion. The pigment portion is typically kaolin clay in a liquid slurry. Other pigment materials, which may be used separately or admixed with kaolin clay, include titanium dioxide, calcium carbonate, barium sulfate, talc, zinc sulfate, aluminum sulfate and calcium oxide reaction products. The materials selected for the pigment portion impart a smooth white surface to the paper and modify brightness and ink receptivity of the coated paper. Generally the pigment slurry is milled under high shear until a very fine dispersion of the solids in the liquid phase is prepared.

To the pigment portion is added the liquid binder portion to improve the adhesive quality of the pigment to the paper. Generally, the binder comprises starches and protein material such as casein or soya protein and synthetic latexes. Also used as a binder is polyvinyl alcohol.

In preparing the coating formulation material, the binder, in aqueous or nonaqueous solution, is admixed with the pigment slurry. This binder-pigment mixture is then coated onto paper. A paper coating composition having a high-solids content is desirable because it reduces the amount of diluent present and consequently reduces the time and energy required to remove the diluent in finishing the paper. A high-solids paper coating composition would also improve coating effectiveness. Those in the paper coating field have long sought means to increase the solids content of a paper coating composition without deleteriously effecting the machining properties of the composition.

SUMMARY OF THE INVENTION

It has now been discovered that a fluid, high-solids paper coating composition having improved machining properties can be prepared by adding an effective amount of a 2-oxazoline polymer to the other components of the paper coating. The fluid paper coating contains an opacifying amount of pigment in an aqueous dispersion containing at least 40 weight percent solids, said dispersion having a pH of at least about 7. A quantity of binder effective to bind the pigment to the paper substrate upon drying is also present in the fluid paper coating composition.

DETAILED DESCRIPTION OF THE INVENTION

2-Oxazoline polymers, referred to hereafter as polyoxazolines, especially those having a weight average molecular weight of from 1,000 up to about 150,000, are useful additives in paper coating formulations comprising a pigment portion and a binder portion. With the addition of polyoxazoline, the pigment portion can be increased to greater than 65 percent of the total paper coating formulation without deleteriously affecting fluidity and viscosity. The addition of the polyoxazoline imparts smooth blade-runability and other improved machining properties to the paper coating resulting in a coating less prone to streaking in application.

As to the paper coating formulation, the pigment portion is generally an aqueous dispersion of coating grade clays or other conventional inorganic pigments used in paper coating. One or more finely-divided inorganic solids, such as titanium dioxide, calcium carbonate, barium sulfate, talc, zinc sulfate, aluminum sulfate and calcium oxide reaction products and other similarly used materials can be employed. Kaolin clays are particularly preferred as a component of the pigment.

Any binder of a type conveniently employed in aqueous coating compositions adapted to provide an adherent, smooth, layer on paper suitable for printing is operable. Exemplary suitable binders include the natural binders such as modified starch, soy bean protein and casein, and sodium algenate and commonly known synthetic binders. Suitable modified starch binders include oxidized, enzyme converted, cationic, thermal-converted and hydroxy-ethylated varieties. These binders also generally modify the rheology of the paper coating.

Suitable synthetic binders include any water-dispersible organic synthetic polymer which is film-forming at ambient temperature. Exemplary preferred binders are latexes or aqueous dispersions of polymers such as polymers of conjugated dienes such as butadiene, chloroprene and isoprene, e.g., styrene/butadiene copolymer, butadiene/acrylonitrile copolymer, styrene/isoprene copolymer, butadiene/methyl methacrylate copolymer, polybutadiene, polyisoprene, polychloroprene and the like, polymers of alkyl esters of $\alpha,\beta$-ethylenically unsaturated carboxylic acids such as acrylate esters, e.g., ethyl acrylate/acrylic acid copolymers, methyl acrylate/itaconic acid copolymers, ethyl acrylate/hexyl acrylate/methacrylamide copolymers, alkyl acrylate/vinyl acetate copolymers, styrene/alkyl acrylate copolymers, vinyl chloride/vinylidene chloride copolymers, and the like. Suitable binders include aqueous dispersions or solutions of such polymers as polyvinyl acetate, polyvinyl alcohol, vinylidene chloride copolymers, ethylene/vinyl acetate copolymers, cellulosics such as methyl cellulose and carboxymethyl cellulose and others commonly used as pigment binders, particularly in conventional paper coating formulations.

A synthetic latex, such as styrene/butadiene latex, is widely used as the binder. A suitable styrene/butadiene latex can contain from 50 to 75 percent styrene and 25 to 50 percent butadiene. Other synthetic latex formulations may also be used. A water solution of hydrolyzed polyvinyl alcohol is also particularly useful as the binder portion. The alcohol used is at least 95 percent hydrolyzed and preferably, for best results, 99.5 percent hydrolyzed from the acetate as being the practical upper limit.

As to the polyoxazoline dispersing agent, said polymers are known compounds which are typically prepared from 2-oxazoline monomers with the aid of cationic catalysts. The 2-oxazoline monomer may be represented by the structural formula:

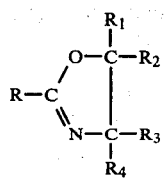

wherein R and $R_1-R_4$ are each independently hydrogen, alkyl, aralkyl, phenyl or inertly-substituted phenyl. See also John A. Frump, *Chemical Reviews*, Vol. 71, No. 5, 483 (1971) at pages 495-6 and W. Seeliger et al., *Angew. Chem. Internat. Edit.*, Vol. 5, No. 10, 875 (1966) at page 880.

Litt et al. teach in U.S. Pat. No. 3,483,141 that said oxazoline polymers may be prepared by heating the monomers in the presence of a catalyst selected from the group consisting of alkyl halides, boron-fluorine compounds, antimony-fluorine compounds, strong acids and salts of strong acids.

The instant polymers contain N-acylethylenimine units or such units bearing substituents inert in the instant composition. The repeating unit of the polymers based on the aforementioned 2-oxazoline monomer can be represented as follows, wherein R and $R_1-R_4$ have the aforementioned meanings:

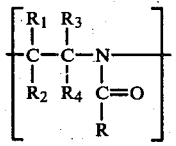

The preferred 2-oxazoline polymers are those wherein R is hydrogen or $C_1-C_4$ alkyl and $R_1-R_4$ are hydrogen. Operable oxazoline polymers include copolymers of 2-oxazoline monomers, wherein R is hydrogen, methyl, or ethyl and $R_1-R_4$ are hydrogen. In addition, the homopolymer of 2-H-2-oxazoline or lower alkyl oxazolines may be used. These include homopolymers of 2-methyl-2-oxazoline, 2-ethyl-2-oxazoline, and the like. Polyethyl oxazoline is generally preferred.

The molecular weight of the polyoxazoline dispersing agents vary between about 1,000 and 150,000 weight average molecular weight (Mw), suitable results being obtained throughout the range. However, the best results are obtained with the use of polyethyl oxazoline in the 45,000 to 60,000 weight average molecular weight range. The aforementioned polymeric molecular weights are determined by gel permeation chromatography.

In preparing the paper coating composition, an aqueous slurry of the inorganic pigment is conveniently prepared by admixing in a water system, the pigment and other additives. The pH is preferably in the alkaline range, between about 7 and about 12, with best results being obtained in the range of from about 7.0 to about 8.0. Alkaline materials such as sodium hydroxide or ammonium hydroxide, are added in the quantities necessary to effect a pH value in the desired range. The pigment slurry is in general prepared as a dispersion containing from about 40 to 75 percent solid by weight. A solids content in the range of 60 to 70 percent solids is preferred for reasons including economy of handling.

The binder portion is conveniently prepared by making an aqueous solution of the binder containing about 40 to about 70 percent solids by weight. The 2-oxazoline polymer may be added to either the pigment slurry or the binder solution. The oxazoline polymer is advantageously used in weight proportion of from 0.005 to 2.0 percent based on the weight of binder. Proportions outside of this preferred range are generally inoperative below the lower limit in the range and are not economical above the upper limit.

The paper coating of the invention is advantageously prepared by dispersing the pigment in an aqueous medium containing the binder. Suitable binder/pigment ratios require sufficient binder to bind the pigment to the paper such that pigment is not removed from coated paper substrate during normal handling, e.g., printing, etc. Suitable ratios also require sufficient pigment to opacify the coated paper substrate. Generally ratios of binder to pigment are in the range from about 1.3 to about 12 volume parts of binder to about 38.8 volume parts of pigment. Preferred ratios are in the range from about 6 to about 10 volume parts of binder to about 38.8 volume parts of pigment.

Generally, the conditions for mixing the pigment and binder portion in this invention are not temperature or pressure sensitive and room temperatures, i.e., 20° C. to 25° C., and atmospheric or superatmospheric pressure may be used as a matter of convenience.

The products of this invention are used to coat paper by methods well-known in the paper coating art, such as, knife, blade, doctor knife, and the like. The dry coated paper is then printed thereon with compatible ink. The paper is smooth, has suitable strength, good printability, good water resistance, and ink holdout properties.

The following non-limiting examples clearly illustrate the invention. Unless otherwise specified, parts and percentages are by weight.

EXAMPLE 1

Preparation of Paper Coating Composition

A pigment-portion aqueous slurry of 64 percent solids is prepared by blending the ingredients tabulated in Table I at high speeds for 30 seconds.

TABLE I

| Material | Quantity (Grams) |
|---|---|
| Ultrawhite 90 ®, a fine particle size kaolin clay distributed by Engelhart Mineral & Chemicals | 1000 |
| Tetrasodium pyrophosphate | 0.8 |
| Calgon T ®, distributed by Calgon Corporation, a division of Merck | 2.5 |
| Water | 420 |
| Total Weight | 1423.3 |

300 Grams of a 50 percent aqueous solution of Dow Latex 620 ® (trademark of The Dow Chemical Company) and 13.3 grams of an aqueous solution containing 15 percent Kelgin ® Medium Viscosity Thickener (Trademark of the Kelco Chemical Co.) is added to the pigment slurry under low speed agitation with an air stirrer. To the above-described pigment, latex and thickener slurry is added 7.5 grams of a 20 percent aqueous solution of polyethyloxazoline having a weight average molecular weight (Mw) of about 55,000. The percentage of solids in the slurry is adjusted to 65 percent by the addition of 25.8 grams water. All coating ingredients are then blended for an additional 5 minutes with an air stirrer to prepare a uniform mixture. The 5 percent of polyethyloxazoline based on the weight of the latex binder is calculated as 1 for this example.

Comparative Experiment

In a comparative example, which does not embody the instant invention, the composition of Example 1 is prepared, except that the polyethyloxazoline is omitted and water is added to the pigment portion to adjust the percent solids in the slurry to 65 percent. The evaluation of this paper coating composition is designated "A" in Table III below.

EXAMPLES 2-4

The process of Example 1 is repeated except that the proportion of polyethyloxazoline in the coating is varied as described in Table II.

TABLE II

| Example No. | % Solids Content | pH | % PeOx on Wt. of Latex Binder |
|---|---|---|---|
| 2 | 65 | 7.8 | 0.5 |
| 3 | 65 | 7.8 | 1.5 |
| 4 | 65 | 7.8 | 2.0 |

The evaluation of the paper coating compositions is tabulated in Table III below.

TABLE III

| | Evaluation of Polyethyloxazoline as a Dispersant in Paper Coatings | | |
|---|---|---|---|
| | Brookfield Viscosity (low shear) | | Hercules Viscosity (high shear) |
| Example No. | 20 RPM | 100 RPM | 45,000 sec.$^{-1}$ |
| "A" | 2400 | 736 | 64 |
| 1 | 3400 | 1004 | 53 |
| 2 | 3220 | 940 | 60 |
| 3 | 4850 | 1520 | 54 |
| 4 | 4680 | 1580 | 62 |

The above viscosities of the paper coating formulations are measured using both a Brookfield Viscometer (low shear) and a Hercules E Bob Viscometer (high shear) at room temperature, e.g., 23° C. The unit of measurement is centistokes.

With the Brookfield Viscometer, using a No. 4 spindle, the spindle is allowed to run one minute to reach equilibrium before a reading is taken. The larger the number, the more viscous the paper coating formulation.

With the Hercules Viscometer the coating formulation to be evaluated is placed in a cup with a bob which spins at varying speeds inside the cup. The varying speed of the bob increases shear rate with time until it reaches a maximum, then decreases the shear rate until it reaches zero. The torque applied to the cup at a specified shear rate directly correlates with the viscosity of the coating at that specific shear rate. Thus, the smaller the number, the less viscous the coating formulation.

The data in Table III reveal that at low shear rates the viscosity increases when PeOx is added to the paper coating formulation. At high shear rates, which closely simulate the conditions of the paper coating process in paper mills, the greatest reduction in viscosity occurs when using from 1.0 to about 1.5 percent polyethyloxazoline based on the total weight of the binder. A measurable decrease in viscosity is obtained when using at least 0.5 percent polyethyloxazoline by weight of binder. No appreciable benefit is noted when more than 2 percent is used.

The data in Table I also reveal the very desirable thixotropic effects of the polyethyloxazoline additive. The rheology of the paper coating formulation containing polyethyloxazoline varies favorably with shear rates. Under high shear conditions the solution remains fluid, smooth and spreadable; at low shear rates the coating solution is much more viscous and adheres to the coated surface with little visible run-off or absorption by the paper.

What is claimed is:

1. An improved fluid, paper coating composition having at least 40 weight percent solids in an aqueous dispersion which contains an opacifying amount of pigment, a binding amount of a binder and an alkaline pH modifying substance in an amount sufficient to produce a pH of at least about 7, wherein the improvement comprises at least about 0.005 percent based on the binder of a 2-oxazoline polymer having a molecular weight of from about 1,000 to about 150,000 as determined by gel permeation chromatography prepared from 2-oxazoline monomers of the formula

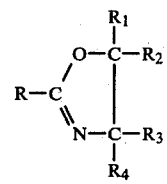

wherein R is alkyl, aralkyl, phenyl or inertly substituted phenyl and $R_1$–$R_4$ are each independently hydrogen, alkyl, aralkyl, phenyl or inertly substituted phenyl.

2. The composition of claim 1 wherein said polyoxazoline is poly-2-ethyl-2-oxazoline.

3. The composition of claim 2 wherein the pigment comprises kaolin clay.

4. The composition of claim 2 wherein the binder comprises starch and latex or latex and protein.

5. The composition of claim 2 wherein the pigment includes a material selected from the group consisting of calcium carbonate, titanium dioxide, barium sulfate, talc, zinc sulfate, and the reaction products of aluminum sulfate and calcium oxide.

6. The composition as described in claim 1 or 2 wherein the 2-oxazoline polymer is present in a proportion of at least about 0.005 percent to about 2 percent by weight based on the weight of the solids in the binder.

7. A process comprising coating paper with the coating composition of claim 1.

8. A paper coated by the process of claim 7.

* * * * *